United States Patent
Zuniga (10) Patent No.: US 7,313,091 B2
(45) Date of Patent: Dec. 25, 2007

(54) METHOD AND SYSTEM FOR CONTROL OF CONGESTION IN CDMA SYSTEMS

(75) Inventor: Juan Carlos Zuniga, Montreal (CA)

(73) Assignee: InterDigital Technology Corporation, Wilmington, DE (US)

(*) Notice: Subject to any disclaimer, the term of this patent is extended or adjusted under 35 U.S.C. 154(b) by 1056 days.

(21) Appl. No.: 10/265,046

(22) Filed: Oct. 4, 2002

(65) Prior Publication Data

US 2003/0218974 A1 Nov. 27, 2003

Related U.S. Application Data

(60) Provisional application No. 60/383,025, filed on May 24, 2002.

(51) Int. Cl.
*H04J 1/16* (2006.01)
*H04B 7/005* (2006.01)

(52) U.S. Cl. ..................... 370/229; 370/278

(58) Field of Classification Search ............ None
See application file for complete search history.

(56) References Cited

U.S. PATENT DOCUMENTS

| | | | |
|---|---|---|---|
| 5,481,533 A | 1/1996 | Honig et al. | |
| 6,069,885 A | 5/2000 | Fong et al. | |
| 6,233,222 B1* | 5/2001 | Wallentin | 370/229 |
| 6,262,980 B1 | 7/2001 | Leung et al. | |
| 6,671,512 B2* | 12/2003 | Laakso | 455/453 |
| 6,708,042 B1* | 3/2004 | Hayakawa | 455/522 |
| 6,850,500 B2* | 2/2005 | Zeira et al. | 370/328 |
| 2001/0005359 A1* | 6/2001 | Bergqvist | 370/230 |
| 2002/0187788 A1* | 12/2002 | McKay | 455/450 |
| 2003/0134641 A1* | 7/2003 | Gustafsson | 455/446 |

FOREIGN PATENT DOCUMENTS

| | | |
|---|---|---|
| WO | 98/24199 | 4/1998 |
| WO | 98/24199 A2 | 4/1998 |
| WO | 98/29961 | 7/1998 |
| WO | 99/45736 | 9/1999 |
| WO | 99/45736 A1 | 9/1999 |
| WO | 00/38348 | 6/2000 |
| WO | 00/38348 A1 | 6/2000 |
| WO | 01/52425 | 7/2001 |
| WO | 01/52425 A2 | 7/2001 |
| WO | 01/93454 | 12/2001 |

OTHER PUBLICATIONS $3^{rd}$ Generation Partnership Project; Technical Specification Group Radio Access Network; Physical layer-Measurements (TDD) (Release 5); 3GPP TS 25.225 V5.0.0 (2002-03).
$3^{rd}$ Generation Partnership Project; Technical Specification Group Radio Access Network; Physical layer-Measurements (TDD) (Release 5); 3GPP TS 25.255 V5.2.0 (2002-09).
Holma, Harri et al. "WCDMA for UMTS", Radio Access For Third Generation Mobile Communications, $3^{rd}$ Edition; pp. 191-193 and 267-268; 2001.

\* cited by examiner

*Primary Examiner*—Edan Orgad
*Assistant Examiner*—Blanche Wong
(74) *Attorney, Agent, or Firm*—Volpe and Koenig, P.C.

(57) ABSTRACT

The present invention is a method and system for monitoring and controlling congestion in a CDMA system having multi-user detection capabilities. The method detects congestion in the uplink by calculating noise rise based on user equipment measurements or radio access network measurements. Upon detection of congestion, congestion relieving measures are implemented as needed.

10 Claims, 5 Drawing Sheets

METHOD AND SYSTEM FOR CONTROL OF CONGESTION IN CDMA SYSTEMS

CROSS REFERENCE TO RELATED APPLICATION

This application claims priority from U.S. Provisional Application No. 60/383,025, filed on May 24, 2002, which is incorporated by reference as if fully set forth.

BACKGROUND

The present invention relates to code division multiple access (CDMA) systems with multi-user detection (MUD) capabilities, where the capacity of the system is limited by non-cancelled intra-cell interference, non-cancelled inter-cell interference and interference associate with the noise floor.

In CDMA systems, one of the factors that limits the capacity of the system is interference. In general, these systems try to generate as little interference as possible. Power control is one approach that is commonly used in order to maintain the interference limits as low as possible. Nevertheless, when a CDMA system attempts to support many users, even if the transmission power is being controlled, the levels of interference may not be acceptable.

The concept of CDMA uplink (UL) pole capacity has been widely used for evaluating when a system is becoming congested. This concept is based on the exponential growth of interference caused by a CDMA system, i.e. all interference above the noise floor. The interference caused by a CDMA system is made up of intra-cell interference and inter-cell interference. Intra-cell interference is interference generated in a cell that is occupied by a user. Inter-cell interference, in contrast, is interference generated from all sources outside of the cell in which the user is located. The pole capacity is the theoretical maximum capacity assuming the mobiles have infinite available transmitting power. The actual capacity is typically a fraction of the pole capacity. Although the concept generally applies to any point-to-multipoint CDMA system, the use of a MUD in the receiver that cancels some of the intra-cell interference varies the principle on which the concept is based thereby rendering the concept not applicable.

A method is therefore needed for evaluating congestion in CDMA systems having MUD capabilities.

SUMMARY

The present invention includes a method and system for monitoring and controlling congestion in the uplink (UL) based on User Equipment (UE) measurements or Radio Access Network (RAN) measurements for code division multiple access (CDMA) systems having multi-user detection (MUD) capabilities.

DETAILED DESCRIPTION OF THE PREFERRED EMBODIMENT(S)

For uplink (UL) congestion detection based on UE measurements, the pole capacity of regular CDMA systems, i.e. CDMA systems not having MUD capabilities, can be determined by measuring the noise rise, which is the ratio of the total perceived interference to noise floor:

$$\text{Noise\_rise} = \frac{\text{total\_perceived\_interference}}{\text{noise\_floor}} = \frac{1}{1-\eta_{UL}} \qquad \text{Equation (1)}$$

where the total perceived interference is all non-cancelled interference (both intra-cell and inter-cell) at the receiver, the noise floor is all noise that is unrelated to the system such as the thermal noise, and $\eta_{UL}$ is the UL load factor. In CDMA systems having MUD capabilities, however, the MUD reduces intra-cell interference ($I_{or}$) and amplifies inter-cell interference ($I_{oc}$). Therefore, to accurately measure noise rise in CDMA systems having MUD capabilities, the $\eta_{UL}$ should account for the affect the MUD has on interference.

To specifically account for the affect of the MUD, two parameters (one to account for the decrease in $I_{or}$ and one to account for the increase in $I_{oc}$) are defined and incorporated into $\eta_{UL}$. The first parameter, $\bar{\alpha}_{UL}$, represents the average ratio of the cancelled $I_{or}$ to the total $I_{or}$ and is used to account for the decrease in $I_{or}$. The second parameter, $\bar{\beta}_{UL}$, represents the average ratio of received extra $I_{oc}$ to the total $I_{oc}$ and is used to account for the increase in $I_{oc}$. The parameters $\bar{\alpha}_{UL}$ and $\bar{\beta}_{UL}$ may be measured, calculated or assumed, as desired. Using $I_{or}$, $I_{oc}$, $\bar{\alpha}_{UL}$ and $\bar{\beta}_{UL}$, the total perceived interference as affected by the MUD is $(1-\bar{\alpha}_{UL})I_{or}+(1+\bar{\beta}_{UL})I_{oc}$.

In a first embodiment of the invention, congestion detection is based on UE measurements. UE measurements, however, with respect to interference generated by the system, are limited to $I_{or}$. Therefore, to also account for $I_{oc}$, $\eta_{UL}$ is obtained according to:

$$\eta_{UL} = (1+i)\sum_{j=1}^{N} \frac{1}{1+\dfrac{W}{\rho_j R_j v_j}} \qquad \text{Equation (2)}$$

where i is a predetermined value representing a ratio of $I_{oc}$ to $I_{or}$ and the sum represents $I_{or}$. In the sum, N is the number of users in the cell; W is the carrier bandwidth; and $\rho_j$, $R_j$ and $v_j$ are the signal-to-noise ratio ($E_b/N_0$) bit rate, and activity factor of the $j^{th}$ user, respectively. Multiplying $I_{or}$ by (1+i) gives $[I_{or}+I_{or}(i)]$ where $I_{or}(i)=I_{oc}$ thereby allowing both intra-cell and inter-cell interference to be accounted for in $\eta_{UL}$. As can be seen from Equation 1, when $\eta_{UL}$ tends to one, noise rise tends to infinity.

Once $\eta_{UL}$ is calculated, noise rise is obtained according to:

$$\text{Noise\_rise}_{dB} = -10 \cdot \log\left[1 - (1 - \overline{\alpha_{UL}} + i + i\overline{\beta_{UL}})\sum_{j=1}^{N} \frac{1}{1 + \frac{W}{\rho_j R_j v_j}}\right].$$

Equation (3)

Figure 1:
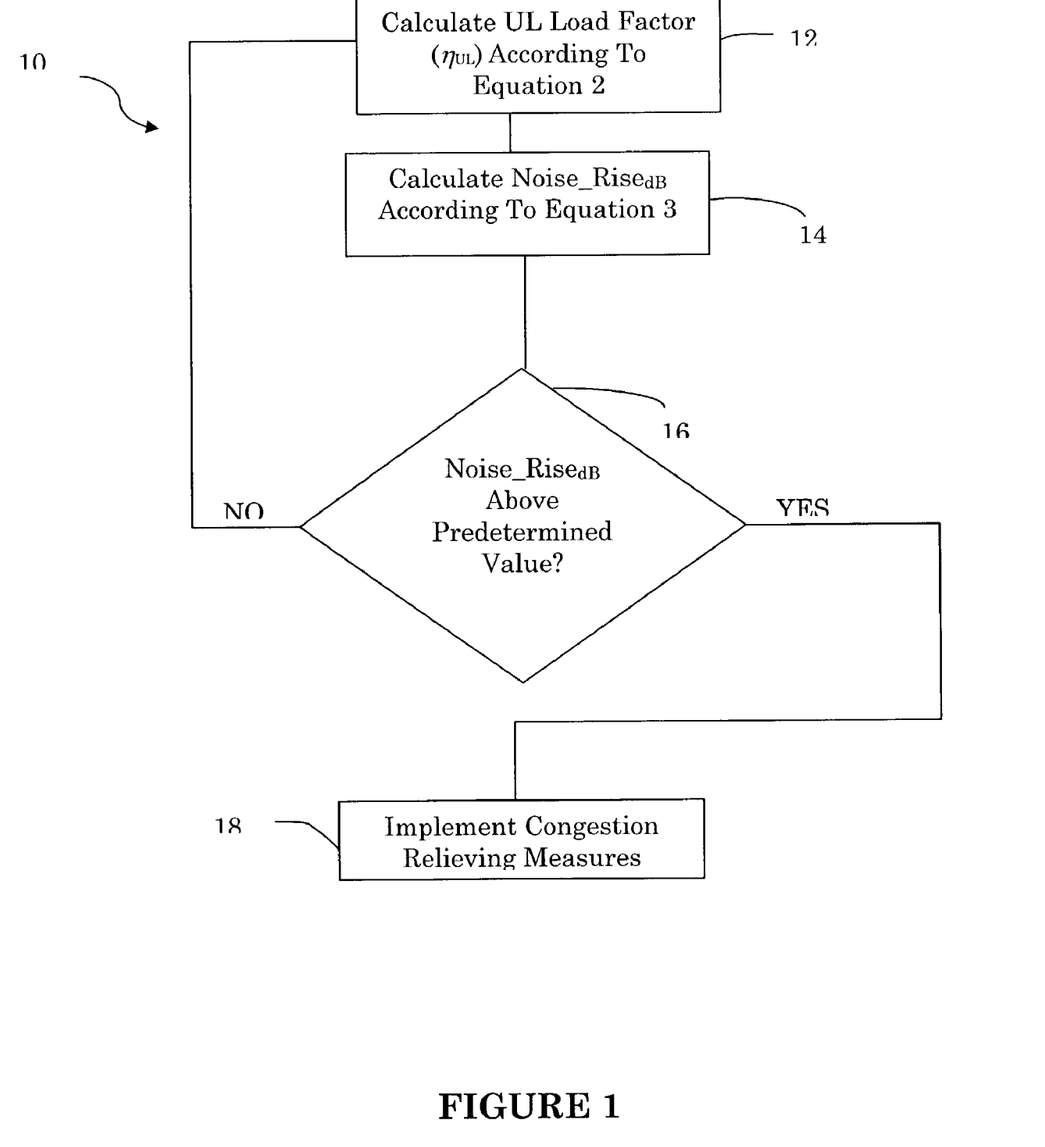
FIG. 1 is a flow diagram showing a method for monitoring congestion in the UL based on UE measurements for CDMA systems having MUD capabilities in accordance with an embodiment of the invention.

In FIG. 1, steps for monitoring congestion in the UL based on UE measurements in a CDMA system having MUD capabilities are shown and indicated generally with reference number 10.

The method begins with step 12 by calculating the UL load factor ($\eta_{UL}$) preferably using equation 2, as explained above. In step 14, Equation 3 is preferably used to calculate the noise rise, as also explained above. The value of noise rise is proportional to congestion and is therefore evaluated in step 16 to determine whether congestion relieving measures should be implemented. If the value of noise rise is above a predetermined value, congestion relieving measures are implemented (step 18). The predetermined value of noise rise that is selected for triggering the congestion relieving measures may be any value. By way of example, in one embodiment, the predetermined value is between about $6_{dB}$ and about $10_{dB}$.

If, in contrast, the value of nose rise is below the predetermined value, the method may start over at step 12. The method may start over at step 12 at a predetermined time interval. The predetermined time interval may be any amount of time, as desired. By way of example, in one embodiment, the time interval is between about 3 seconds to about 5 seconds.

In another embodiment of the invention, UL congestion detection may be based on RAN measurements. In this embodiment, both $I_{oc}$ and $I_{or}$ and both $\overline{\alpha}_{UL}$ and $\overline{\beta}_{UL}$ may be defined by reading measurements available at the base station (BS). Therefore, in contrast to the first embodiment, $\eta_{UL}$ and noise rise may be calculated without using a predetermined value to obtain $I_{oc}$.

More specifically, $\eta_{UL}$ is obtained according to:

$$\eta_{UL} = 1 - \frac{\text{noise\_floor}}{\text{total\_perceived\_interference}}$$

Equation (4)

where the noise floor is again all noise that is not related to the system and the total perceived interference comprises all non-cancelled interference at the receiver. Since the elements needed to calculate total perceived power are known, the total perceived power may be calculated according to $(1-\overline{\alpha}_{UL})\text{Ior}+(1+\overline{\beta}_{UL})\text{Ioc}$ thereby allowing $\eta_{UL}$ to be calculated according to:

$$\eta_{UL} = 1 - \frac{\text{noise\_floor}}{(1 + \overline{\beta_{UL}})Ioc + (1 - \overline{\alpha_{UL}})Ior}$$

Equation (5)

Once $\eta_{UL}$ is obtained, the effective noise rise is obtained according to:

$$\text{Noise\_rise}_{dB} = 10 \cdot \log\left[\frac{(1 + \overline{\beta_{UL}})Ioc + (1 - \overline{\alpha_{UL}})Ior}{\text{noise\_floor}}\right]$$

Equation (6)

Figure 2:
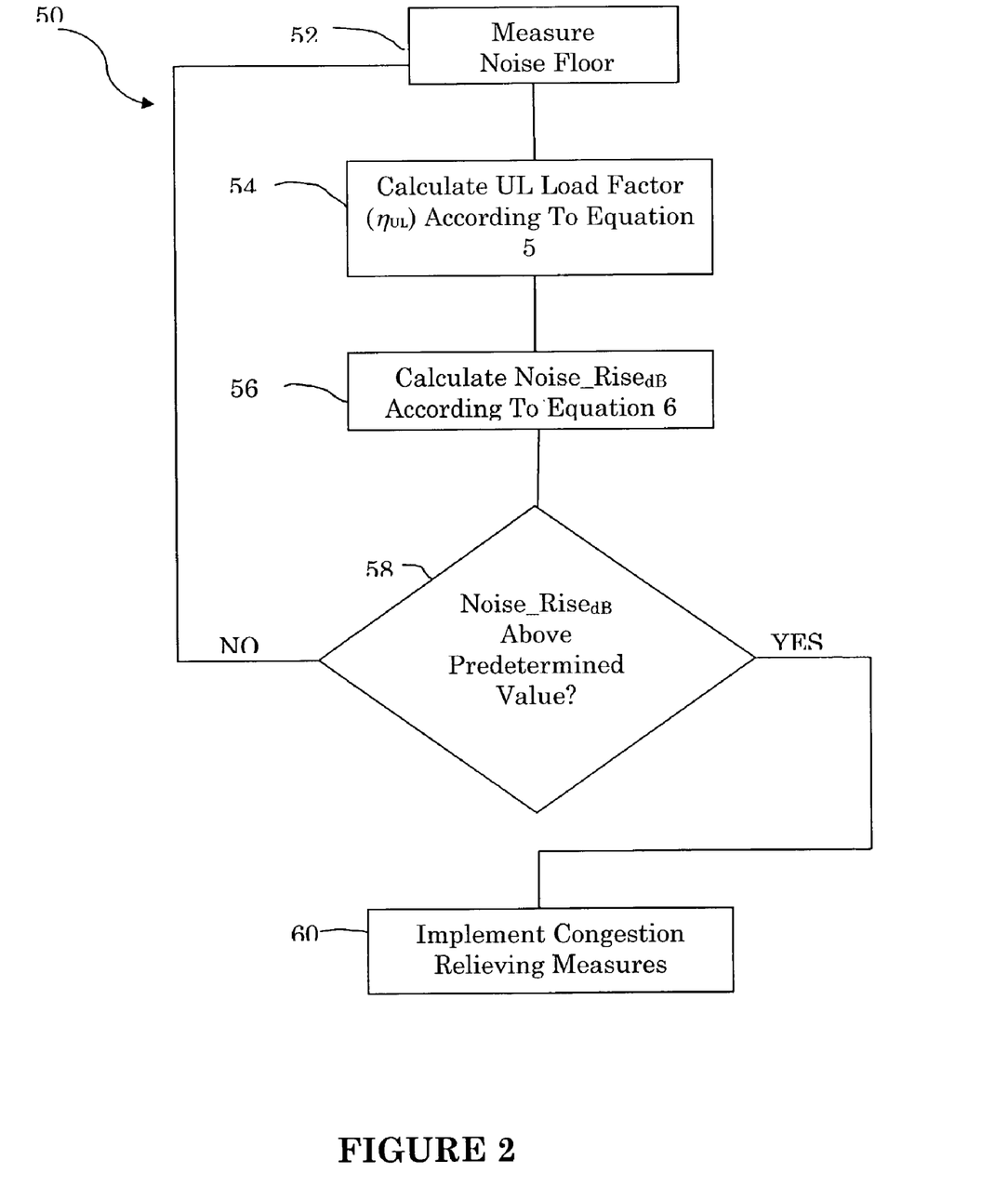
FIG. 2 is a flow diagram showing a method for monitoring congestion in the UL based on RAN measurements for CDMA systems having MUD capabilities in accordance with an embodiment of the invention.

In FIG. 2, steps for measuring and avoiding congestion in the UL based on RAN measurements in a CDMA system having MUD capabilities are shown and indicated generally with reference number 50.

The first step 52, is to measure the noise floor. Then, in step 54, to calculate $\eta_{UL}$ preferably according to Equation 5, as explained above, where $I_{oc}$, $I_{or}$, $\overline{\alpha}_{UL}$ and $\overline{\beta}_{UL}$ are defined by reading measurements available at the BS. In an alternate embodiment, however, the ratio $\overline{\alpha}_{UL}$ may be calculated according to:

$$\overline{\alpha_{UL}} \cong \frac{\sum_{i=1}^{M}\left[1 - \frac{\overline{\text{Rx\_code\_power}_i} \cdot \overline{SF_i}/\overline{SIR_i} - \overline{Ioc_i}}{(\text{total\_perceived\_interference} - \overline{Ioc_i}) - \overline{\text{Rx\_code\_power}_i}}\right]}{M}.$$

Equation (7)

In that embodiment, $\overline{\beta}_{UL}$ is considered negligible thereby eliminating the need to for it to be read from the BS receiver. The additional parameters shown in Equation 7 are identified and defined from measurements taken at the BS receiver. By way of explanation, the additional parameters included in Equation 7 are Received Code Power for User i (Rx_Code_Power$_i$), Spreading Factor for User i (SF$_i$), and Number of Active Codes in the Timeslot (M).

Once $\eta_{UL}$ is obtained, noise rise is calculated according to Equation 6 in step 56. As with the embodiment shown in FIG. 1, the value of noise rise is proportional to congestion. Therefore, the value of noise rise is evaluated in step 58 to determine whether congestion relieving measures should be implemented. If the value of noise rise is above a predetermined value, congestion relieving measures are implemented (step 60). Alternatively, if the value of noise rise is below the predetermined value, the method may start over at step 52 at a predetermined time interval. As with the embodiment described in conjunction with FIG. 1, the predetermined values of noise rise and time interval may be any values, as desired.

The implementation of congestion relieving measures may be accomplished in a variety of ways. For example, the signal-to-noise ratio ($E_b/N_0$) target of certain users can be reduced thereby forcing those users to reduce their transmission power. A drawback of this approach, however, is that those users will experience errors in the information transmitted and the quality of the link is greatly reduced.

A preferred method for relieving congestion is to reduce the data transmission rate of a particular user or users. Users determine their transmission power depending on the data transmission rate, spreading factor gain and maximum transmission power and path loss. Therefore, reducing the data transmission rate of a particular user, which implicitly reduces power, allows the same signal-to-noise ratio to be achieved with the same spreading gain, but with less power. Furthermore, in WCDMA TDD systems, reducing the data transmission rate implies that a certain user is not transmitting at all in a timeslot thereby providing the additional benefit of relieving congestion for that timeslot.

The preferred method for relieving congestion limits data transmission rate at the source; therefore no retransmissions are required. The selection of the user or users to whom the rates will be reduced is made by considering the transmitted power, received power and class of service. Those factors are considered for each user and may be considered individually, collectively or as a particular combination thereof, as desired. The user or users that contribute the most to the interference and have the lowest service class priority are preferably chosen as candidates for data rate reduction.

Figure 3:
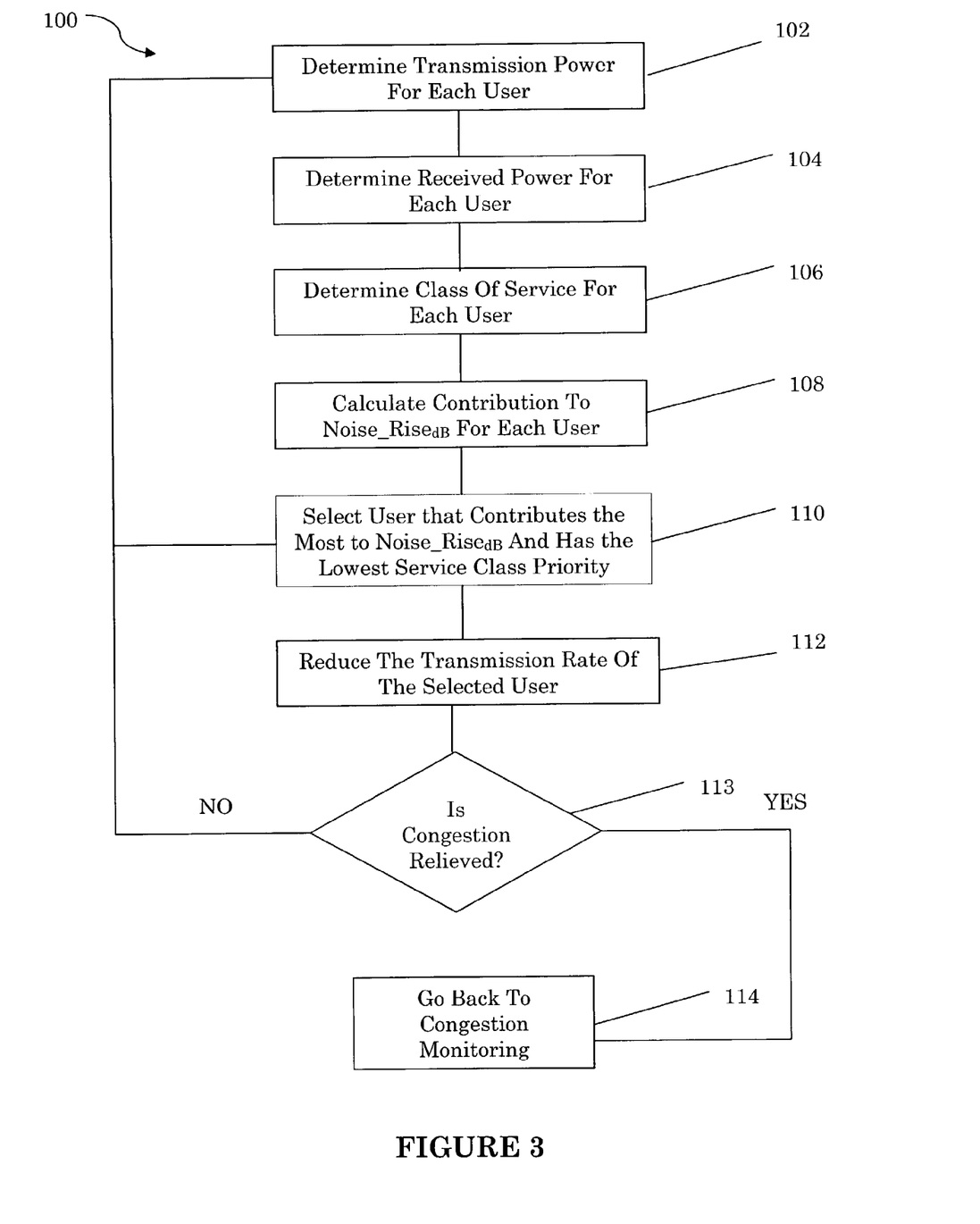
FIG. 3 is a flow diagram showing a method for relieving congestion in accordance with an embodiment of the invention.

The preferred method for relieving congestion is shown in FIG. 3 and indicated generally with reference numeral 100. To begin, transmission power, received power and class of service are determined for each user in steps 102, 104 and 106, respectively. Then, in step 108, each user's contribution to noise rise is calculated. As explained, noise rise may be calculated according to Equation 3 or Equation 6, as desired.

In step 110, the user that collectively contributes the most to the noise rise and has the lowest service priority is selected. To determine the selected user, a predetermined weighting factor may be used for each parameter. It is important to note that any value may be used for the weighting factor so that the influence of priority and noise contribution in selecting a user may be adjusted as desired. Furthermore it may desirable to use only one of those parameters or, alternatively, it may be desirable to use additional parameters which, like noise contribution and priority, may be weighted as desired. The criteria for selecting a user is completely flexible and may be any criteria which accurately identifies users having data transmission rates that may be reduced so as to reduce congestion. Therefore, the selected user may, for example, be determined according to:

$$\text{User\_selected} = W1(\text{priority}) + W2(\text{noise contribution}). \quad \text{Equation 8}$$

In step 112, the data transmission rate of the selected user is reduced. In step 113, the amount of congestion is evaluated to determine whether congestion has been relieved. If the corresponding reduction in the noise rise is sufficient to reduce the value of noise rise below the predetermined value at which congestion is detected, the method ends and congestion monitoring, as described in conjunction with FIGS. 1 and 2, may continue (step 114). Alternatively, if the congestion has not been relieved so that the value of noise rise is below the predetermined value, congestion still exists and the method 100 returns to step 110 or 102, as desired, and continues until the congestion is relieved.

Figure 4:
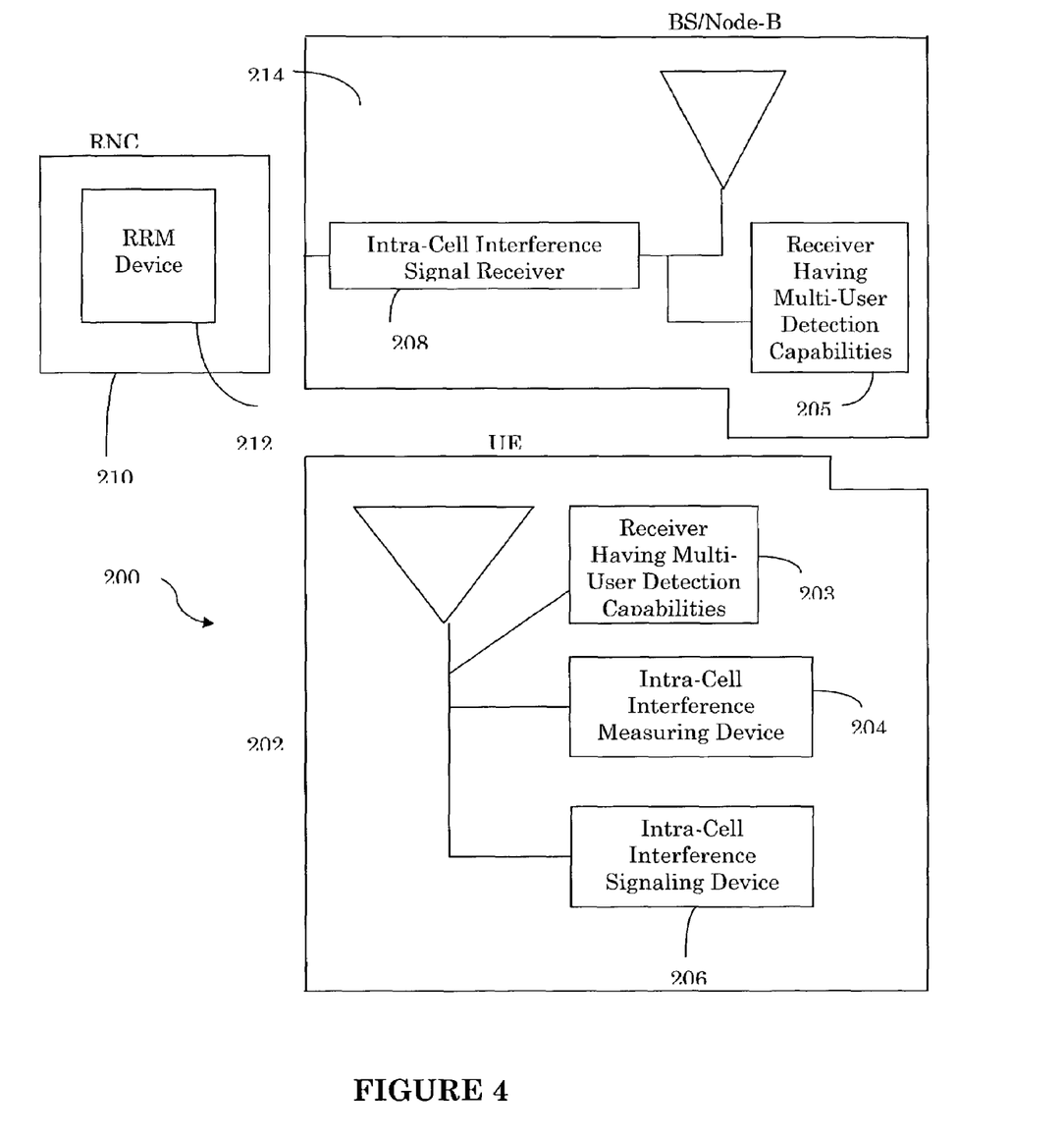
FIG. 4 is a system for monitoring and controlling congestion in the UL based on UE measurements in accordance with an embodiment of the invention.

Referring now to FIG. 4, a system 200 is shown for controlling congestion in the UL based on UE measurements. In system 200, congestion in the UL is monitored and controlled using UE measurements. The system 200 comprises at least one UE 202, a BS or node-B 214 and a radio network controller 210.

The UE comprises a receiver 203 having MUD capabilities, an $I_{or}$ measuring device 204 and an $I_{or}$ signaling device 206. The $I_{or}$ measuring device 204 utilizes information available at the UE 202 to measure the amount of interference generated by the system within the cell in which the UE 202 is currently located. As previously explained, that type of interference is referred to as intra-cell interference ($I_{or}$).

The BS or node-B 214 includes a receiver 205 having a MUD and an $I_{or}$ signal receiver 208. The $I_{or}$ measured by measuring device 204 is transmitted from the $I_{or}$ signaling device 206 of the UE 202 to the $I_{or}$ signal receiver 208 of the BS or node-B 214. The BS or node-B 214 communicates the $I_{or}$ to a radio network controller (RNC) 210 comprising a radio resource management (RRM) device 212. The RRM 212, in conjunction with the BS or node-B 214, if needed, processes $I_{or}$ so that the total inference, as affected by the MUD(s) 203, 205, may be obtained. As explained above, the total interference may be obtained using $I_{or}$, $\bar{\alpha}_{UL}$, $\bar{\beta}_{UL}$ and i.

Once the total interference is obtained, $\eta_{UL}$ and noise rise is also obtained. If the noise rise is above a predetermined value, each users' contribution to the noise rise is measured. Preferably, each users' transmission power, received power and class of service is also measured. The data transmission rate of the user currently having the highest contribution to noise rise and the lowest class of service is reduced as needed until the overall noise rise falls below the predetermined value. In other words, if reducing the data transmission rate of what was the highest contributor to noise rise is not sufficient to reduce noise rise to below the predetermined value, the method continues by recalculating each users' noise rise contribution and reducing the data transmission rate of the highest contributor. Alternatively, the method may continue by using the current user calculations and simply reduce the rate of the next highest contributor.

Figure 5:
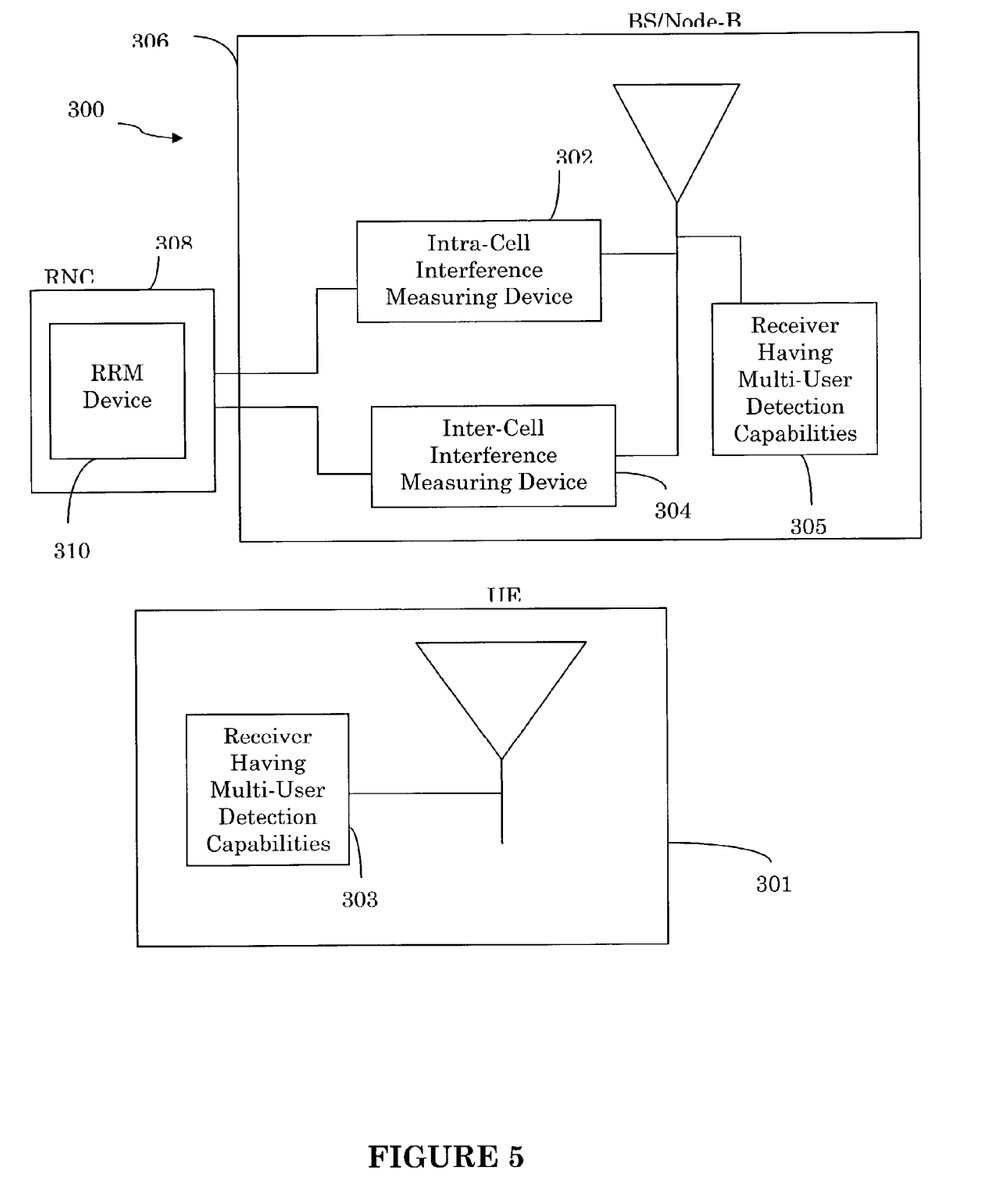
FIG. 5 is a system for monitoring and controlling congestion in the UL based on RAN measurements in accordance with the invention.

In FIG. 5, another embodiment of a system for controlling congestion in the UL is shown and indicated generally with reference numeral 300. In system 300, congestion in the UL is monitored and controlled using RAN measurements. The system 300 comprises at least one UE 301, a BS or node-B 306 and a RNC 308.

The UE 301 comprises a receiver 303 having MUD capabilities. The BS or node-B 306 includes a receiver 305 having MUD capabilities, an $I_{or}$ measuring device 302 and an $I_{oc}$ measuring device 304. The BS or node-B 306 communicates the $I_{or}$ and $I_{oc}$ to a radio network controller (RNC) 308 comprising a radio resource management (RRM) device 310. The RRM 310, in conjunction with the BS or node-B 306, if needed, processes $I_{or}$ and $I_{oc}$ so that the total interference, as affected by the MUD(s) 303, 305, may be obtained. As explained above, the total interference may be obtained using $I_{or}$, $I_{oc}$, $\bar{\alpha}_{UL}$, and $\bar{\beta}_{UL}$.

Once the total interference is obtained, $\eta_{UL}$ and noise rise is also obtained. If the noise rise is above a predetermined value, each users' contribution to the noise rise is measured. Preferably, each users' transmission power, received power and class of service is also measured. The data transmission rate of the user currently having the highest contribution to noise rise and the lowest class of service is reduced as needed until the overall noise rise falls below the predetermined value, as explained in connection with FIG. 4.

Although the present invention has been described in detail, it is to be understood that the invention is not limited thereto, and that various changes can be made therein without departing from the spirit and scope of the invention, which is defined by the attached claims.

What is claimed is:

1. A method for controlling congestion in a CDMA system with multi-user detection capabilities, the method comprising:
   calculating a noise rise value based on user equipment measurements wherein the calculated noise rise value is indicative of interference in the system;
   monitoring the noise rise value to detect congestion; and
   implementing congestion relieving measures when congestion is detected, and wherein the congestion relieving measures include:
   determining a class of service for each user;
   calculating a contribution to noise rise for each user;
   selecting a user who is currently contributing the most to noise rise and has the lowest class of service; and
   reducing data transmission rate of the selected user.

2. The method of claim 1 wherein the user equipment measurements comprise a value of intra-cell interference.

3. The method of claim 1 wherein the step of calculating a noise rise value includes accounting for an affect on interference caused by the multi-user detection capability of the CDMA system.

4. The method of claim 3 wherein the affect on interference caused by the multi-user detection capability is a decrease in intra-cell interference and an increase in inter-cell interference.

5. A method for controlling congestion in a CDMA system with multi-user detection capabilities, the method comprising:
   measuring noise floor;
   calculating a noise rise value based on radio access network measurements wherein the calculated noise rise value is indicative of interference in the system;
   monitoring the noise rise value to detect congestion; and
   implementing congestion relieving measures when congestion is detected, and wherein the congestion relieving measures include:
   determining a class of service for each user;
   calculating a contribution to noise rise for each user;
   selecting a user who is currently contributing the most to noise rise and has the lowest class of service; and
   reducing data transmission rate of the selected user.

6. The method of claim 5 wherein the radio access network measurements comprise a value of intra-cell interference and a value of inter-cell interference.

7. The method of claim 6 wherein the radio access network measurements are measurements taken by at least one base station within the radio access network.

8. The method of claim 5 wherein the step of calculating a noise rise value includes accounting for an affect on interference caused by the multi-user detection capability of the CDMA system.

9. The method of claim 5 wherein the affect on interference caused by the multi-user detection capability is a decrease in intra-cell interference and an increase in inter-cell interference.

10. A method for controlling congestion in a CDMA system with multi-user detection capabilities, the method comprising:
    measuring noise floor;
    calculating a noise rise value that takes into account the affect the multi-user detection capability has on interference;
    monitoring the noise rise value to detect congestion; and
    implementing congestion relieving measures when congestion is detected, said congestion relieving measures comprising:
    determining a class of service for each user;
    calculating a contribution to noise rise for each user;
    selecting a user who is currently contributing the most to noise rise and has the lowest class of service; and
    reducing data transmission rate of the selected user.

* * * * *

UNITED STATES PATENT AND TRADEMARK OFFICE
CERTIFICATE OF CORRECTION

PATENT NO. : 7,313,091 B2
APPLICATION NO. : 10/265046
DATED : December 25, 2007
INVENTOR(S) : Juan Carlos Zuniga It is certified that error appears in the above-identified patent and that said Letters Patent is hereby corrected as shown below:

ON THE TITLE PAGE

At section (56), FOREIGN PATENT DOCUMENTS, page 1, right column, delete lines 1 & 2, and insert therefor --WO 98/24199    6/1998
WO 98/24199  A2  6/1998--.

At section (56), OTHER PUBLICATIONS, page 1, right column, line 6, after "3GPP TS", delete "25.255" and insert therefor --25.225--.

IN THE SPECIFICATION

At column 1, line 17, before the words "with the", delete "associate" and insert therefor --associated--.

At column 4, lines 42-52 delete Equation 7, and insert therefor $$--\overline{\alpha}_{UL} \cong \frac{\sum_{i=1}^{M}\left[1 - \frac{\overline{Rx\_code\_power_i} \cdot SF_i)/\overline{SIR_i} - \overline{Ioc_i}}{(\overline{total\_perceived\_interference} - \overline{Ioc_i}) - \overline{Rx\_code\_power_i}}\right]}{M}--.$$

At column 4, line 54, after the word "need", delete "to".

At column 4, line 59, before the word "Spreading", delete "(Rx_Code_Power_1)," and insert therefor --(Rx_Code_Power_i),--.

UNITED STATES PATENT AND TRADEMARK OFFICE
CERTIFICATE OF CORRECTION

PATENT NO.         : 7,313,091 B2
APPLICATION NO.  : 10/265046
DATED              : December 25, 2007
INVENTOR(S)        : Juan Carlos Zuniga It is certified that error appears in the above-identified patent and that said Letters Patent is hereby corrected as shown below:

At column 5, line 51, after the word "may", insert --be--.

At column 6, line 28, after the word "total", delete "inference" and insert therefor --interference--.

At column 6, line 35, before the word "also", delete "is", and insert therefor --are--.

Signed and Sealed this

Thirteenth Day of May, 2008

JON W. DUDAS
*Director of the United States Patent and Trademark Office*